July 22, 1958 W. E. DAVIS 2,844,092
AUTOMATIC DENSITY CONTROLLED APPARATUS FOR BALING
Filed May 18, 1955 2 Sheets-Sheet 1

INVENTOR
WILLIAM E. DAVIS
BY Moore and Hall.
ATTORNEYS

July 22, 1958  W. E. DAVIS  2,844,092
AUTOMATIC DENSITY CONTROLLED APPARATUS FOR BALING
Filed May 18, 1955  2 Sheets-Sheet 2
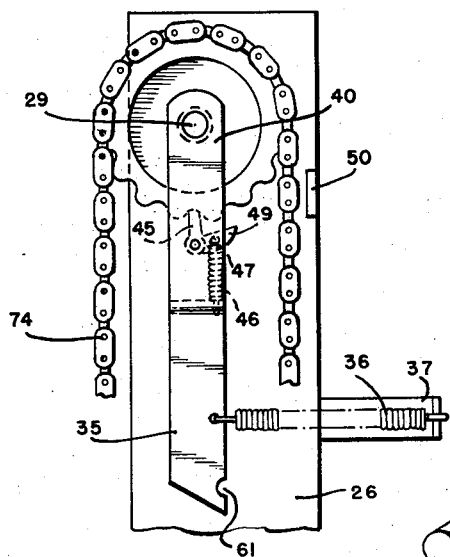
FIG. 2.
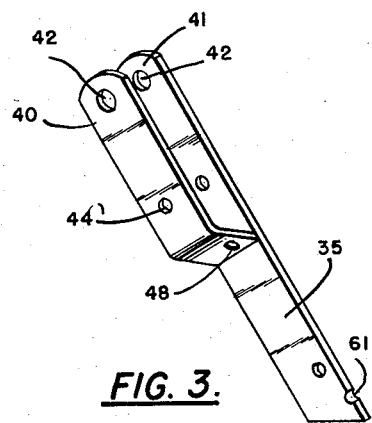
FIG. 3.
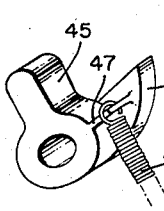
FIG. 4
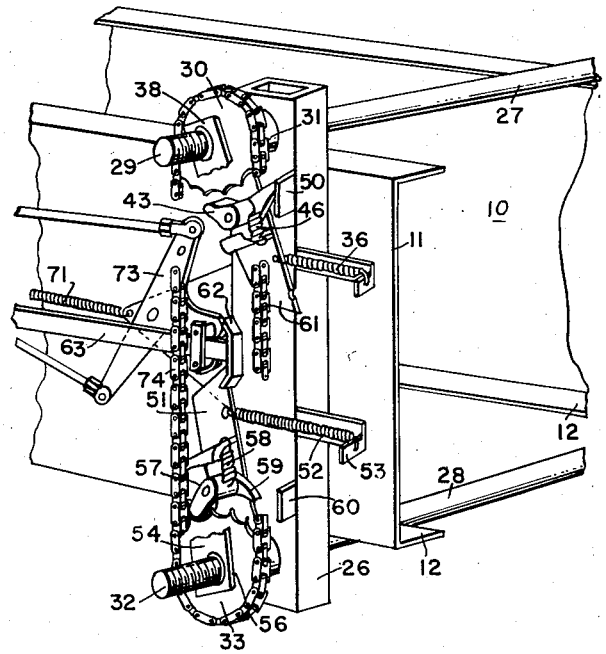
FIG. 5.
FIG. 6
INVENTOR
WILLIAM E. DAVIS
BY *Moore and Hall*
ATTORNEYS

United States Patent Office 2,844,092
Patented July 22, 1958

2,844,092

AUTOMATIC DENSITY CONTROLLED APPARATUS FOR BALING

William Edwin Davis, Seven Springs, N. C.

Application May 18, 1955, Serial No. 509,373

6 Claims. (Cl. 100—43)

The present invention concerns improvements in automatic controls for balers by which the density of a bale of hay, straw or similar product may be held within desired limits.

It is an object of the invention to provide a baler with means to resist the movement of a mass of material to be baled to a greater or lesser degree whereby to control the density of the bale.

It is an object of the invention to provide a baler with a star wheel having points capable of penetrating a mass of material being baled to a depth depending upon the density of the material in the incipient bale and by such movement to restrict or widen the bale by an amount depending upon the movement of the star wheel. The controlled resistance to the movement of the material being baled may be achieved by varying the distance between the side walls of the baler where the bale is formed or a portion of the walls. Again the result could be obtained with a number of rimless spoked wheels with controlled braking action. The spokes would penetrate the bale and the deeper the penetration the greater the braking action. Again the penetration of the spokes could be constant and the braking action controlled by a star wheel.

One of the most time consuming and troublesome problems with hay balers is the need of constant adjustment of the tension of the rear of the baling chamber because of varying baling conditions. When baling is begun in the early morning, the hay will normally have a high moisture content and will pack very tightly, side wall friction is high and it is necessary to release the tension on the rear or discharge end of the chamber to allow the hay to pass through more freely. By the middle of the day the hay will be very dry, will slide through the chamber easily and it will be necessary to reverse the procedure by tightening the tension. Even while baling at noon, there will be varying conditions in a single windrow because a field may be heavy at one end and light at the other, and the heavy end of the windrow will naturally have a higher moisture content because of the amount of hay which is unexposed to the drying action of the air. On the other hand, at the light end of the windrow the hay may be quite dry. This variation in both amount and character may cause a complete adjustment from full open to full closed along the length of a single windrow. Again, there are times when two crops are planted together such as vetch and oats. The vetch may be good at one end of the field and practically bare at the other. This could means that in baling one startst with a very high percentage of vetch at one end of the windrow with the crop nearly one hundred percent oats at the other end. The high variation in the effective coefficient of friction of the vetch requires a constant adjustment of the tension on the end of the baling chamber. Again, in going from one field to another wide variations in condition of the hay to be baled may be met with, as no two hay crops normally will have the same moisture content, nor will they have the same friction coefficient. Barley straw, for example, will be different from oats because of its waxy surface. Alfalfa will be different due to its gummy surface, and so forth. It has been found that with past constructions, new operators have to a great degree worn out or even wrecked hay balers before learning how to maintain the proper tension for the varying conditions. The present invention provides an inexpensive mechanism to regulate the compression action on the hay being baled. It provides a free turning star wheel which is pressed into the bale by a compression spring at a point close to the ram. When the hay at this point becomes too compact, the star wheel will be pushed upward and outward, causing an arm linkage to travel forward. By means of connecting link and bell crank the end of a rod is raised until it engages another arm on an adjusting mechanism at the end of the baling chamber. By this action threaded means joining the two ends of the baling chamber are rotated, spreading the chamber at this end and releasing the compression action of the chamber walls on the hay being baled. This permits the hay to move more freely under the action of the ram so that the hay is less compact in the bale. If on the other hand, the hay adjacent the ram is too loose and the star wheel is allowed to drop down into the hay being baled, the reverse action will take place and the threaded members will be so rotated that the discharge end of the baling chamber is restricted so that more resistance is experienced by the hay being pressed by the ram with the result that the compactness or density of the hay in the bale is increased to the desired value, causing the star wheel to rise again to that level which maintains the distance between the ends of the baling chamber walls such that the friction of the walls on the passing hay will produce just the right amount of density in the bale. It will be understood that the above construction need not be made too critical. It is enough that it operate within desired limits which may themselves be varied by using a compression spring having a suitable Hook's Law constant acting on the star wheel constant or adjusting the linkage to allow more or less movement of the star wheel before the adjusting mechanism operates.

Other objects will appear as the description proceeds.

The drawings are included for illustrative purposes only, to show a preferred form of the invention, and are not intended to be limiting. Like numerals refer to like parts throughout.

Figure 2 is a fragmentary elevation of a detail of Figure 1.

Figure 3 is a perspective view of one form of lever arm for use in the form of the invention illustrated.

Figure 4 is a perspective view of one form of pawl used with the invention.

Figure 5 is a fragmentary elevation of a detail of Figure 1.

Figure 6 is an enlarged fragmentary view of part of Figure 1, showing the tension adjusting mechanism.

Figure 1:
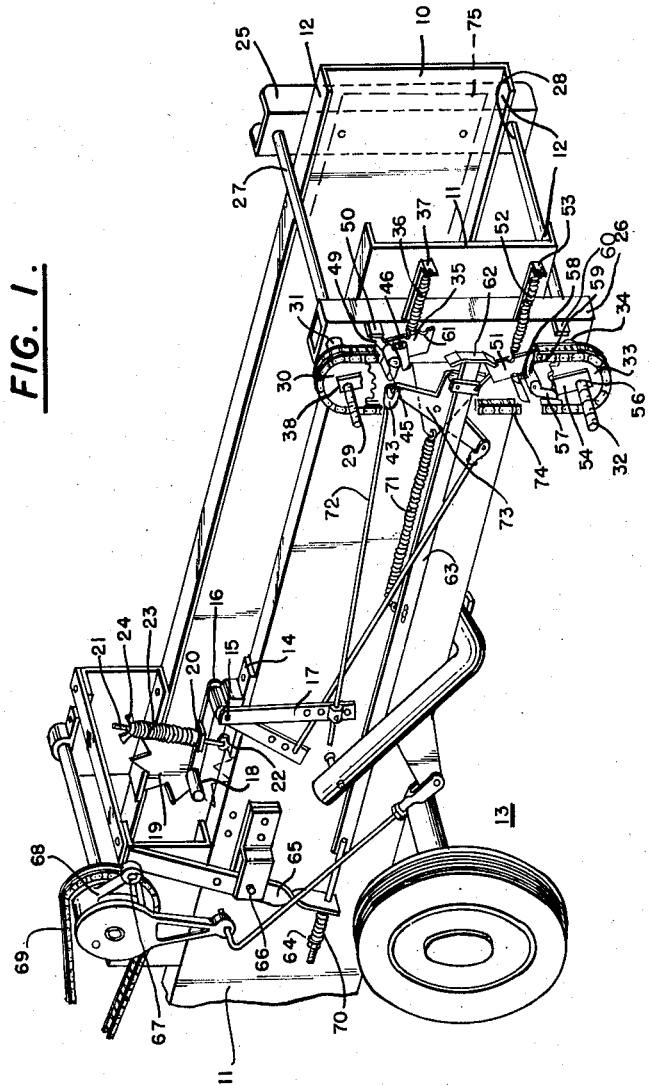
Figure 1 is a fragmentary perspective view of one preferred form of the invention.

The density control apparatus as shown in Figure 1 comprises channel shaped side members 10 and 11 having upper and lower flanges 12. The intake end of channel shaped members 10 and 11 form part of the normal baler generally indicated at 13. Carried by one of the upper channels 12 is a mounting means 14 comprising a bearing in which is journaled a pivot pin 15, having an arm 16 keyed to one end thereof and an arm 17 keyed to the other end. Arm 16 carries a bearing 18 at its free end in which is pivotally mounted a star wheel 19 positioned substantially midway between the channel members 10 and 11 adjacent their intake ends. Lever 16 caries a flange member or arm 20 through which passes a threaded hook member 21. The hook end of member 21 engages an eye 22 formed in that end of mounting means 14 adjacent star wheel 19. A compression spring member 23 surrounds threaded member 21 and is compressed between flange 20 and a wing nut 24 threaded on member 21. The amount of compression of spring 23 determines the amount of force required to move star wheel 19 upwardly and in this way an indication of the density of the material being baled can be determined. The free ends of channel members 10 and 11 have upright members 25 and 26 mounted on their outer sides. Cross members 27 and 28 connect the corresponding ends of upright members 25 and 26. Cross member 27 has one end anchored in upright 25 and the other end passes through the upper end of upright 26. The end of cross member 27, passing through upright member 26, is threaded as at 29 and carries thereon a sprocket 30 internally threaded for mounting on the threads 29. Sprocket 30 has a shoulder which bears against a corresponding shoulder 31 on upright member 26. It will be seen that as the sprocket 30 is rotated on the threaded portion 29 of cross member 27 it will move toward the upright member 26 and force it together with channel member 11 toward channel member 10 and its upright member 25. If the sprocket 30 is rotated in the opposite direction it will permit the material being baled to force the channel members 10 and 11 to move farther apart. The cross member 28 extending through the bottom of upright 26 is of substantially the same construction being threaded at 32 and having an internal eye threaded sprocket 33 mounted thereon. Sprocket 33 bears against shoulder 34 on upright member 26. A lever arm 35 is fastened to the sprocket 30 and rotates therewith. Lever arm 35 is spring biased counterclockwise by tension spring 36 mounted on upright member 26 by means of arm 37.

Sprocket wheel 30 is provided with shoulders 38, 39 which receive bifurcated arms 40 and 41 on the lever arm 35. It will be seen that the holes 42 ride on the shoulders 38 and 39 and keep the ends 40, 41 free of the threads 29. A pawl 43 is pivoted at 44 in the bifurated ends 40, 41 and has a rounded end 45 for engaging the teeth of sprocket wheel 30. A tension spring 46 acts on arm 47 of pawl 45 and is anchored at 48 on arm 40. Spring 46 biases pawl 45 in a clockwise direction in Figures 2 and 4 so that it will tend to engage the teeth of sprocket wheel 30. Pawl 45 carries a release cam 49 which acts against projecting surface 50 mounted on upright member 26 to free the pawl 45 from the sprocket 30 during those periods when the lever 35 is pulled in a counterclockwise direction to its inactive position by spring 36. The full counterpart of lever 35 and pawl 45 are to be found in conjunction with the sprocket 33, that is a lever arm 51 is urged in a clockwise direction by spring 52 mounted on upright member 26 by means of arm 53. Lever 51 has two bifurcated members 54 and 55 which ride on shoulders 56 of sprocket 33. A pawl 57 is carried by the members 54, 55 and engages the sprocket wheel 33 under the action of tension spring 58 which urges the pawl in a counterclockwise direction. A cam member 59 forming part of pawl 57 tends to rotate the pawl in a clockwise direction and free of sprocket 33 when it engages the outstanding arm 60 carried by upright member 26. Each of the lever arms 35 and 51 have adjacent their outer ends a notch 61 by means of which they can be engaged by double ended finger member 62 mounted on the end of rod 63 which is connected by means of overload mechanism 64 to a rod 65. Rod 65 is pivoted to channel member 11 at 66. The upper end of arm 65 carries cam rollers 67 which ride on continuously rotating cam 68 forming part of the knotter drive sprocket 69. Other suitable means connected to the drive of the baler may be used to reciprocate the arm 65 continuously if desired. The overload means 64 comprises a spring 70. The arm 63 is biased to the right by tension spring 71 which maintains the lower part of the arm 65 in contact with the end housing of compression spring 70. It will be seen that as long as the machine is in operation, the rod 63 is in more or less constant reciprocatory motion whereby the double ended finger member 62 is moved back and forth to an extreme right position beyond that of the arms 35 and 51 when their respective pawls are freed from the sprockets under the actions of springs 36 and 52.

As the material being baled increases in density, the star wheel 19 is less able to penetrate it and will tend to rise and ride on top of the hay, straw, cotton or other material. This action of the star wheel 19 may of course be adjusted by means of wing nut 24 and spring 23, but once a desired setting is made and the star wheel rises because of an increase in density of the baled material above that desired, the arm 17 is rotated clockwise and pulls connecting rod 72 to the left in Figure 1, rotating bell crank 73 in a counterclockwise direction and raising the rod 63 and its finger member 62 to a position whereby the upper finger of member 62 engages the notch 61 of arm 35. As the rod 63 moves to the left carrying finger member 62 and the engaged lever 35 with it, cam member 49 leaves the surface 50 and permits pawl 45 to rotate clockwise under the action of spring 46 whereby the pawl 45 engages sprocket 30 and rotates it in a clockwise direction. As long as bell crank 73 maintains the counterclockwise position mentioned above, and the rod 63 continues to reciprocate, it will be seen that the pawl 45 will be moved and cause the sprocket 30 to rotate in a clockwise direction step-by-step. Sprocket 30 is connected to sprocket 33 by means of a chain 74 and therefore will cause the sprocket 33 to rotate in the same manner and direction. It will be noted, however, that during this operation the lever arm 51 is pulled to the right under the action of tension spring 52 and its cam 59, by engagement with the surface 60, has rotated the pawl 57 so that it no longer engages the sprocket 33, leaving the sprocket 33 free to move under the action of chain 34. As the sprockets 30 and 33 rotate under the action of rod 63 and finger member 62 in its raised position, it will tend to permit the channel members 10 and 11 to move farther apart causing a less compacting action on the material being baled and thus decreasing the density thereof.

As the density of the material being baled decreases, the star wheel 19 is able to penetrate it and thereby lowers the lever 16 and rotates the lever 17 in a counterclockwise direction. This action moves rod 72 to the right and causes bell crank 73 to rotate in a clockwise direction, lowering the double finger member 62 so that even though it continues to reciprocate, it will no longer engage notch 61 of lever arm 35, but temporarily at least, will take a median position in which neither of the arms 35 nor 51 is engaged.

If for any reason the material being baled has insufficient density so that the star wheel 19 begins to penetrate it too deeply, then the lever 17 is rotated in a counterclockwise direction moving the rod 72 farther to the right and also rotating bell crank 73 to its full clockwise position. This action lowers the finger member 62 until it engages the notch 61 in lever 51 and due to succeeding reciprocations pulls the lever 51 to the left whereby the cam member 59 is freed of member 60 and the pawl 57 engages the sprocket wheel 33 and rotates it in a clockwise diretcion which is opposite to that described above. This action will cause sprockets 30 and 33 to rotate on threaded members 29 and 32 and force the channel members 10 and 11 closer together, thus compacting the material being baled and increasing its density until such time as the star wheel rides on a desired level and the finger member 62 is again raised to a median position where it is freed of both of the arms 35 and 51. This condition of median position of the finger member 62 will continue as long as the density of the baled material remains within desired limits. If instead of moving the entire channels 10 and 11, it is desired to anchor them to the frame, then portions of the wall on each side such as indicated at 75 may be moved inwardly by members 25 and 26 provided with suitable offsets so as not to bear against the channels 10 and 11.

While there have been described above what are at present believed to be preferred forms of the invention, it will be understood that variations may suggest themselves to those skilled in the art. The appended claims are couched in generic terms to cover all such variations as fall within the true spirit of the invention.

I claim:

1. In combination in a baling device, means for receiving material to be baled comprising spaced movable walls and means for moving said walls to and from each other, said means for moving said walls comprising a reciprocating member, a pair of spaced levers engageable by said reciprocating member one at a time, a pair of tension members for spacing said walls a desired distance apart, movable means connected to said tension members for adjusting the tension thereof and positioned so as to be moved to a desired tension adjusting position by said levers, means to reciprocate said reciprocating member, means to move said reciprocating member into tension adjusting engagement with said spaced levers one at a time, and control means for moving said reciprocating member into a position of engagement with one of said levers in accordance with the density of the material being baled, said control means comprising a density sensing member whereby said spaced movable walls are moved toward each other when the density of the material being baled is relatively low, and away from each other when the density is relatively high.

2. The combination set forth in claim 1, said sensing member comprising a spring biased arm having a member which enters into the material being baled and rotates said arm an amount depending upon the density of the material being baled.

3. The combination set forth in claim 2, and including knotting means for tying a bale of the material being baled, said drive means for said reciproacting member being connected to drive said knotting means.

4. The combination set forth in claim 2, said tension members comprising rods threaded at one end, said movable means connected thereto comprising a sprocket wheel threaded on each of said rods.

5. The combination set forth in claim 4, a spring biased pawl carried by each said spaced levers for engaging said sprocket wheel.

6. The combination set forth in claim 5, a sprocket chain connecting said sprocket wheels to cause them to act simultaneously to adjust the distance between said movable walls.

References Cited in the file of this patent

UNITED STATES PATENTS

| | | |
|---|---|---|
| 2,478,012 | Raney | Aug. 2, 1949 |
| 2,633,794 | Rothrock | Apr. 7, 1953 |